United States Patent

[11] 3,543,937

| [72] | Inventor | Joseph M. Choun |
| | | 13300 Braun, Golden, Colorado 80401 |
| [21] | Appl. No. | 749,761 |
| [22] | Filed | Aug. 2, 1968 |
| [45] | Patented | Dec. 1, 1970 |

[54] FILTER MEDIA
8 Claims, 10 Drawing Figs.

[52] U.S. Cl. ................................................ 210/150,
210/263, 261/95
[51] Int. Cl. ........................................ B01d 23/10
[50] Field of Search ................................ 210/150,
151, 506, 263; 261/94—98; 55/91, 97

[56] References Cited
UNITED STATES PATENTS

| 2,051,727 | 8/1936 | Levine et al. ................ | 210/150X |
| 2,188,162 | 1/1940 | Schulhoff ...................... | 210/150X |
| 3,227,429 | 1/1966 | Renzi ............................ | 210/150X |
| 3,347,381 | 10/1967 | Minch et al. ................... | 210/150 |
| 3,364,656 | 1/1968 | Whiton et al. ................. | 261/94X |
| 3,402,103 | 9/1968 | Amberg et al. ................ | 210/150X |
| 3,410,057 | 11/1968 | Lerner ........................... | 55/97 |

Primary Examiner—John W. Adee
Attorney—Van Valkenburgh and Lowe

ABSTRACT: A filter for the treatment of liquid effluent and sewage having a filter media consisting of a thin-wall shell of polymeric resin of sufficient rigidity as to be self-supporting in the filter bed. The shells are reticulated by an array of comparatively large diameter openings to facilitate a trickling flow of liquid and a free circulation of air to the interior of the shells as well as to the exterior thereof. The surfaces of the shells are preferably scored or pitted to facilitate the retention of bacterial growths thereon. Preferably, the shells are spherical in form and manufactured as hemispherical units having outstanding equatorial flanges which join together to form a completed unit.

Patented Dec. 1, 1970 3,543,937

INVENTOR.
Joseph M. Choun
BY
Van Valkenburgh & Lowe
ATTORNEYS

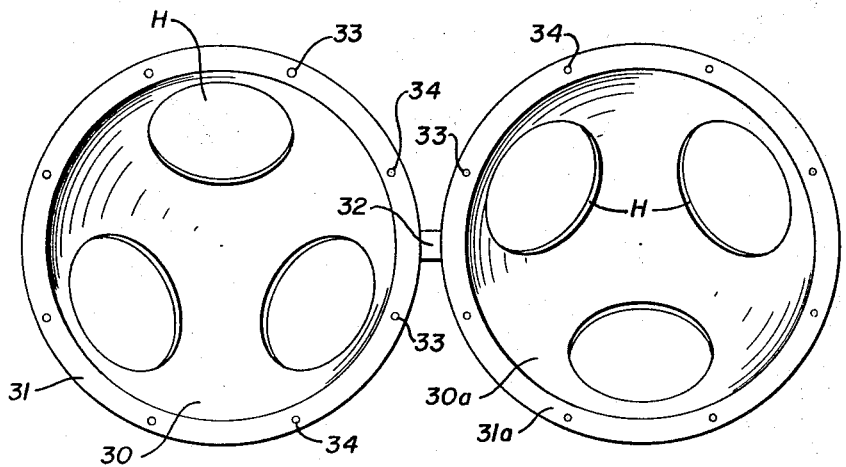
FIG. 4
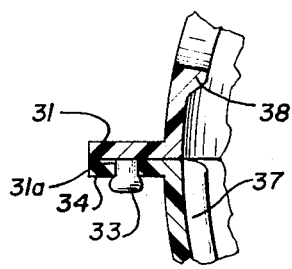
FIG. 5
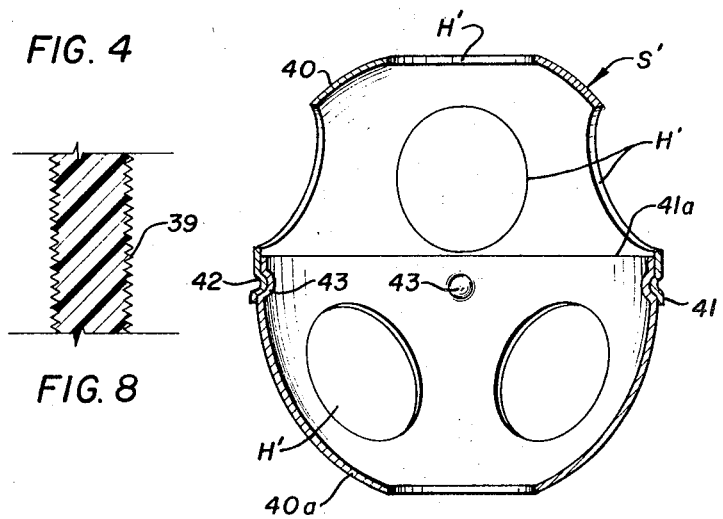
FIG. 8
FIG. 9
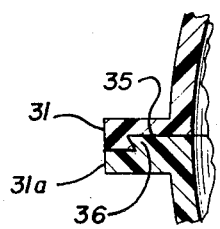
FIG. 6
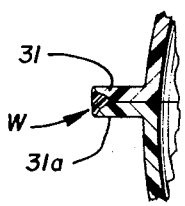
FIG. 7
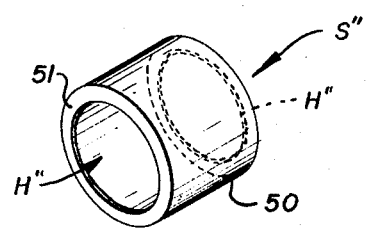
FIG. 10
INVENTOR.
Joseph M. Choun
BY
Van Valkenburgh & Lowe
ATTORNEYS

3,543,937

FILTER MEDIA

This invention relates to apparatus for the treatment of liquid effluent, sewage and organic industrial wastes, generally referred to as waste waters, and more particularly to filter systems therefor, wherein the organic content of the waste waters is biologically oxidized. A primary object of the invention is to provide in a filter tank, a novel and improved biofilter media.

In general, the basic structure of a filter consists of a large, open tank provided with a drainage s stem in its bottom for prompt removal of water passing through it, and this tank is filled with a filter media characterized by a large void content to permit air circulation through it. The waste water is sprayed or otherwise disposed over the surface of the media so that it may trickle and percolate through the media. Aerobic biological organisms within the filter media digest the organic matter in the waste water converting the same into protoplasm which is subsequently removed from the purified waste water, as in a settling tank.

Heretofore, it was a common practice to use selected types of rounded stones, varying in size from 3 to 5 inches in diameter, as a filter media. While such stones would wet easily and effectively retain the desirable biological organisms as slimes and molds upon their surfaces, they were difficult to place and had the further disadvantage of crumbling and deteriorating after a period of time requiring periodic replacement. Moreover, due to extensive construction activities in municipal areas, the supply of suitable stones became insufficient for the large filter units required. This brought about the development of several filter media constructions. One type of filter media consists of a crisscross array of redwood slats spaced apart sufficiently to provide adequate air circulation as the waters trickle from one slat to the next. Another type of filter media uses preformed sheets of selected synthetic resins which are arranged in a tank in layers and form a definite pattern so that water will percolate from one layer to the next as it flows to the bottom of the tank. The primary objection to either type of construction resides in the fact that an expensive, time consuming installation of the media is required, which added to the costs of materials, renders the overall costs excessive. Moreover, in either case where repairs and cleaning operations are require necessitating the removal of a portion or all of the filter media, the dismantling of the filter media is a major project.

The present invention was conceived and developed with the foregoing considerations in view, and especially because of the need for a filter media which could be installed in a more economical manner. The present invention comprises, in essence, in combination with a filter tank, a media which consists of thin-walled shells, preferably spherical in form, and made of a selected synthetic resin. The shells may be installed into the tank by merely dumping or pouring them therein. An individual shell is a thin, lightweight member reticulated by an array of comparatively large holes about its surface to permit percolation of water and air ventilation into, as well as about the shell, and thus increases the effective surfaces whereon the bacterial action may take place.

It follows that another object of the invention is to provide a novel and improved biofilter media for waste water which permits an effective percolation of water through the filter bed and at the same time, provides substantial, continuous passageways of voids throughout the media to permit a circulation of air sufficient to replenish the oxygen as it is used by micro-organisms in digesting organic matter of the waste water.

Another object of the invention is to provide a novel and improved biofilter media for a waste water filter which consists of a large number of reticulated, lightweight shells which can be manufactured at a minimal unit cost without the necessity of custom forming any parts and components for each particular installation.

Another object of the invention is to provide a novel and improved biofilter media for a waste water filter which may be installed in a filter tank at an absolute minimum expense and which may thereafter, whenever the need arises, may be cleaned in place within the tank, quickly and whenever necessary, be easily removed therefrom to facilitate tank maintenance and repairs.

Another object of the invention is to provide a novel and improved filter media for a waste water filter, formed as reticulated shells, which may be manufactured in a simple manner with low cost, synthetic, plastic resins and in forms conducive to effective water percolation and ventilation, both within and without the shells, and which may be provided with surfaces enhancing the hydrophilic characteristics of the shells to better retain moisture and to hold molds and slimes necessary for the biological oxidizing of the organic content of the waste waters.

Other objects of the invention are to provide a novel and improved filter media which is simple, economical, durable, rugged and reliable in its use.

With the foregoing and other objects in view, all of which more fully hereinafter appear, my invention comprises certain constructions, combinations and arrangements of parts and elements as hereinafter described, defined in the appended claims and illustrated, in preferred embodiments, in the accompanying drawing, in which:

FIG. 4 is a plan view of the inside of a pair of hemispherical components which are joined together and which fold against each other to form the shell shown at FIG. 3.

FIG. 5 is a fragmentary sectional detail as taken from the indicated line 5-5 at FIG. 3, but on an enlarged scale to depict one manner in which the hemispherical components forming a shell may be joined together.

FIG. 6 is a fragmentary sectional detail similar to FIG. 5, but illustrating another mode of joining the hemispherical components together.

FIG. 7 is a fragmentary sectional detail, similar to FIG. 5, but illustrating yet another mode of joining the hemispherical components together.

FIG. 8 is a fragmentary sectional detail of a small portion of the shell, as taken from the indicated line 8-8 at FIG. 3, but on a greatly enlarged scale to illustrate, in a somewhat diagrammatic manner, one mode of physically preparing the surface of the shell to better adapt it to retain moisture and bacterial growths.

FIG. 9 is a sectional elevational view of a different form of a shell illustrative of a modified embodiment of the shell.

FIG. 10 is an isometric view of yet another form of a shell illustrative of a third embodiment of the invention.

Figure 1:
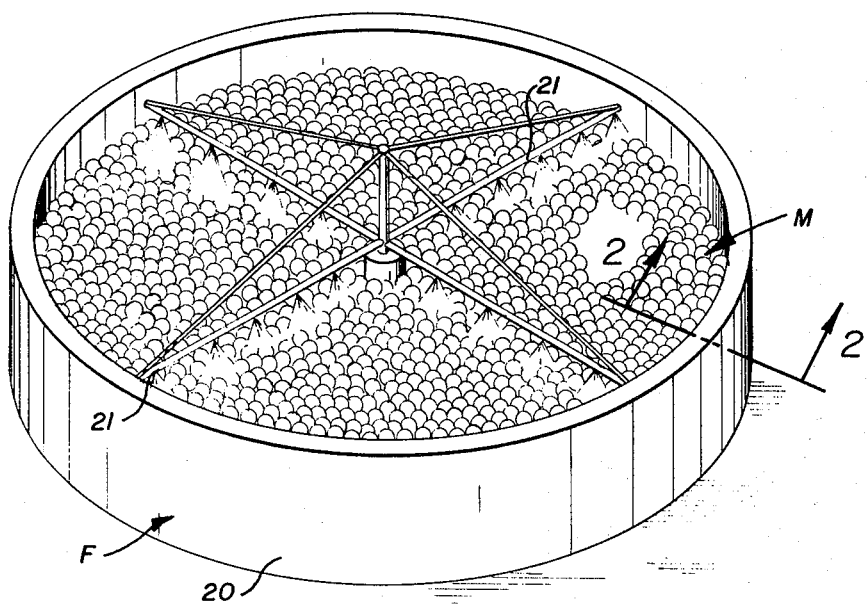
FIG. 1 is a perspective view of a typical sewage treatment filter tank, illustrating in a somewhat diagrammatic manner, the use of the improved filter media therein.
Figure 2:
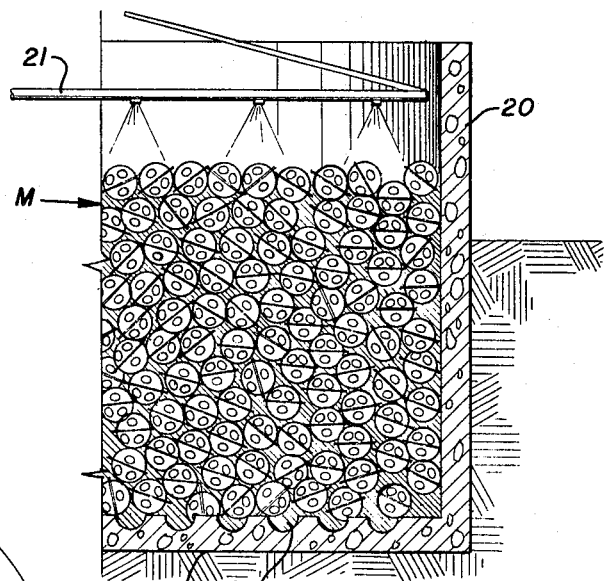
FIG. 2 is a fragmentary sectional portion of the tank, as taken from the indicated line 2-2 at FIG. 1, but on an enlarged scale.

Referring more particularly to the drawing, the filter F, illustrated at FIGS. 1 and 2, is representative of one type in general use for the treatment of sewage and similar effluent wastes where organic substances in the water are to be digested by aerobic micro-organisms. The filter F is formed as a tank 20, open at the top for free access of air thereto. This tank is preferably circular in form and may be cm comparatively large in diameter, 50 feet or more, and with a depth ranging from 6 to 8 feet. The circular form facilitates a uniform spraying of water upon the filter media M, filling the tank by spray arms 21 which connect with and slowly rotate about a standpipe 22 at the center of the tank. In the preferred embodiment of the invention, the filter media M consists of a large number of reticulated, spherical shells or capsules as hereinafter further described, and as water is sprayed onto this filter media, it will percolate downwardly through the media to be exposed to the oxidizing action of a aerobic micro-organisms. Thence, the water collects in drains 23 at the bottom 24 of the tank and is thereby removed from the tank through a main drainpipe, not shown.

The spherical shells or capsules which form the filter media M are made of a synthetic resin of any selected type which is substantially inert to the action of water, air, sunlight, bacteria and any deleterious substances which may be in the waste water. A number of polymeric materials are suitable for this purpose, but in view of the necessity of forming these shells at a low unit cost, a thermoplastic type of material which may be injection molded, is preferable. Such materials may include, but are not restricted to, polyvinyl chloride, polystyrene, polyethylene polypropylene and polyamide resins. The essential properties which the material must have include: resistance to deterioration; ease of molding to a desired form; structural strength in a comparatively, thin-walled unit which is sufficient to permit a shell at the bottom of a tank to support the load of other shells within the tank above it; low unit cost and a surface which is, or which may be rendered hydrophilic to retain moisture and bacterial growths.

Figure 3:
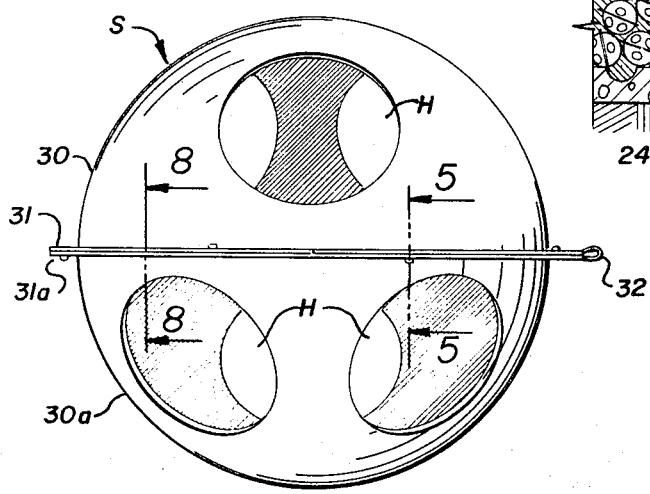
FIG. 3 is a side elevational view of a preferred embodiment of a shell constituting a unit of the filter media.

Although the referred form of the shells or capsules forming the filter media is spherical, as illustrated at FIG. 3, the present invention is not restricted to such a form because thin-walled, reticulated shells of other forms may be used and may be poured or dumped into a filter tank in a random manner. A basic property of a shell is that it have sufficient openings in the walls thereof to permit the interior of the shell to be ventilated, and water to trickle over both the interior and exterior surfaces of the shells.

The shell S, illustrated at FIG. 3, is spherical in form, but having an outstanding equatorial flange for interconnecting two hemispherical sections as hereinafter described. This spherical shell S is provided with six holes H, spaced in a uniform arrangement on the spherical surface thereof. The shell S', illustrated in section at FIG. 9, depicts a spheroidal shell formed as two cup-shaped hemispheroidal sections telescoped together. This shell includes ten uniformly spaced holes H' which are spaced about the surface of the shell or capsule. The shell S'', illustrated at FIG. 10, represents what is probably the simplest form of a shell which can be used for the purpose at hand, and consists of a short, tubular cylinder, with the open ends constituting two spaced holes H''.

Each type of Shell S, S' or S'' may be used to fill a filter tank, and when poured or dumped into the tank in a random manner to fill it, there can be no consistent arrangement of one shell with respect to another. Each shell will contact other shells, with some shells having a hole at a bottom position and other shells will have a wall portion at the bottom position. In every instance, however, some water will trickle over the shell and some water will trickle through the shell, and likewise, the movement of air through the filter will tend to flow both around and through each shell. Moreover, regardless of the orientation of the shell, only a small amount of water can be retained within it because at least one hole H, or H', or H'', will be at or near the bottom level of the shell permitting it to effectively drain, with one only a small amount of water being desirably retained to hold the effective aerobic bacteria growths.

The hemispherical shell S, illustrated at FIGS. 3 and 4, may be of any selected size and thickness and a size varying from 3 inches in diameter to 5 inches in diameter is preferable. It was found that a 3¼ inch diameter shell having six 1¼ inch diameter holes H in the surface thereof, would be sufficiently rigid when made with a 0.030 inch thickness shell. The problem of forming this shell S with a plurality of holes H in the wall thereof, at a production cost sufficiently low for the purpose at hand, appeared to be extremely difficult and the structure illustrated at FIG. 4 was evolved which consists of the formation of two hemispherical sections 30 and 30a, with each having an outstanding equatorial flange 31 and 31a respectively, lending rigidity to the unit and providing a means for interconnecting one hemisphere with the other. It is desirable to orient the holes H of one hemisphere 30 with respect to the other and in a symmetrical manner. Three holes are provided in each hemisphere in an array spaced at 120° apart, and in order to assure that one set of holes of one hemisphere is staggered with respect to the set of the mating hemisphere, the two hemispheres 30 and 30a are interconnected by a thin flap 32 of material at the edges of the respective flanges 31 and 31a which forms a hinge permitting one flange to be folded upon the other in a proper position.

The interconnection of the flanges 31 may be by any one of several modes, and the construction illustrated at FIGS. 3, 4 and 5 provides for studs 33 on one flange and sockets 34 on the other flange in registration with the studs of the first mentioned flange. These studs and sockets can be arranged in a peripheral array about the flanges in any suitable manner as with some of the studs and some sockets being on each flange. The studs have enlarged ends, as shown at FIG. 5, which are adapted to snap fit into the sockets so that the two sections may be simply snapped together to form the spherical shell.

The construction illustrated at FIG. 6 provides for a continuous, circumferential socket 35 in one flange and a mating, locking offset 36 in the other flange. A substantial pressure may be required to lock this arrangement together, compared with the pressure required to fasten the studs 33 into sockets 34 above mentioned; nevertheless, the socket 35 and offset 36 will hold the two hemispherical sections together with a much tighter fit.

The construction illustrated at FIG. 7 provides for interconnecting the two flanges together as by welding as at W. The welding may be at spots at the edges of the flanges, as illustrated, or may be a joining of the contacting surfaces of the flanges. The weld may be effected by the use of solvents or it may be a thermal weld as by processes and with equipment well known and commonly available.

The hemispheres constituting a sphere S are preferably formed by a process of injection molding and the dies for such molding may provide various structural features to improve the basic shell form described above. For example, suitable ribs, such as 37 shown at FIG. 5, may be used to reinforce the shell and permit it to be manufactured with a minimum weight. Also lips, such as 38 shown at FIG. 5, may be provided at each hole H to reinforce the structure and to assure the retention of a small amount of liquid within the shell regardless of its position within the filter media. Further, the dies may be surfaced to mechanically facilitate the wetting action of the surface of a shell and the retention of water and growths thereon. This is accomplished by the formation of small, closely-spaced striations, ridges or pocks in the surface of the die which are, in turn, impressed into the surface of the finished unit, as illustrated diagrammatically at 39 at FIG. 8.

Not only do these striations 39 tend to increase the wetability of the finished units, but they also help to retain bacteria on the surfaces of the shells. If the shell units are formed of material which does not wet easily, they may be treated to enhance their hydrophilic properties. This may be accomplished by passing the hemisphere units through an oxidizing flame or by ionization or by chemical treatment. Such operations are well known to the industrial the technicians skilled in the art of manufacturing articles of synthetic resin plastics and need not be described in detail. Suffice to state, it is important that shells S, forming the filter media, be hydrophilic and preferably, with a roughened surface.

The spheroid S', illustrated at FIG. 9, is formed similar to the construction illustrated at FIG. 4, excepting the unit includes, optionally, a larger number of smaller holes through each hemispheroidal section 40 and 40a. In this construction, four holes are spaced about each hemispheroidal section at 90° apart and a fifth hole is provided in the crown thereof. These sections 40 and 40a may be interconnected by various means and the mode of interconnection at FIG. 9 is exemplary of one such means. In the FIG. 9 arrangement, the equatorial rim 41 of the section 40 is enlarged over the rim 41a of the section 40a so that one unit will telescope into the other as illustrated, and the units, when so telescoped, may be fitted together as by snaps 42 on the rim 41 fitting into sockets 43 of the rim 41a.

It is contemplated that this spheroid S' will be manufactured in precisely the same manner as the sphere S, that is, that the hemispheroidal sections will be formed by injection molding, and that the surfaces will be rendered hydrophilic and include striations and indentations as heretofore described.

Also, rib-type reinforcements ma be provided, as hereinabove described, to minimize the amount of material required in the manufacture of a unit of give strength and rigidity.

The cylindrical shell or capsule S", illustrated at FIG. 9, is formed essentially as a short tube 50 having each end open to provide the holes H". To enhance the rigidity of the tube against side compressive forces, the cylindrical wall at each end may be enlarged and turned inwardly as a short flange 51. It is contemplated that this cylindrical member 50 can be made of a unitary piece and that a suitable mode of manufacture could be either by injection molding or by providing an extruded tube which is cut to selected lengths with the flange portions 51 being formed as the cutting occurs or thereafter by a simple upsetting operation against a heated plate, or by heating to form a flange portion somewhat in the form of a heavy bead. As in the units heretofore described, the surfaces of the tubular shell must be rendered hydrophilic and will be formed preferably with striations which may be provided in the die forming the shell or in the extruding die of if the shell is formed of tubing. It is to noted that the inturned flange 51 provides a concavity of surface within the capsule, the tube S" adjacent to the opening, the same as the spherical surface within the spherical shells S and S' provides a concavity of surface within those shells. This so-called concavity of surface within the shells, or capsules, will cause the retention of a small amount of water in practically every shell regardless of the manner in which it is oriented when dumped into the filter bed.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

I claim:

1. In a trickle filter unit for biological treatment of waste water, a filter media comprising a bed of a plurality of individual thin-wall capsule members dropped into the bed in a random manner, said members being of a synthetic resin plastic having surfaces which are essentially hydrophilic, each member being formed as a capsule having a plurality of holes through the wall thereof; each member and the holes therein being of a diameter to permit waste water to trickle within and about the member and at the same time to permit gas to ventilate both the interior and exterior of the member; each member having a concavity of surface at its interior adjacent to each hole whereby most of the members in the filter media bed will retain a small amount of liquid within them regardless of the manner in which they were oriented when dropped into the filter media bed.

2. In the filter media defined in claim 1, wherein the shells are substantially spherical in shape.

3. In the filter media defined in claim 1, wherein the shells are spherelike members formed by joining two hemispherical sections together at a common equator.

4. In the structure defined in claim 1, wherein the surfaces of the shells are formed with small irregularities to further facilitate the retention of water thereon.

5. In the media defined in claim 1, wherein the shells are formed as short, open end cylindrical members, with the open ends constituting the aforesaid holes and an inturned flange about each end to provide a concavity of surface within the shell adjacent to each opening.

6. In combination with a filter for the treatment of waste water, a filter media comprising a bed of thin-wall shells, each shell being formed of a synthetic resin plastic characterized by having surfaces which are essentially hydrophilic; each shell being reticulated by a plurality of holes through the wall thereof, of a diameter sufficient to permit waste water to trickle both into and about the shell and at the same time permit air to ventilate both the interior and exterior of the shell; each shell being spherelike members formed by joining two hemispherical sections together at a common equator, wherein each hemisphere section is formed with an outstanding flange at its equator which is adapted to register with the corresponding flange of another hemisphere section; and means at the flanges adapted to interconnected the two sections.

7. In the structure defined in claim 6, wherein the interconnecting means includes a stud on one flange and a socket on the other flange alined with the stud when the two sections are positioned to be interconnected whereby the stud may be engaged within the socket.

8. In the structure defined in claim 6, wherein said flanges are welded together.